(12) United States Patent
Jasperneite et al.

(10) Patent No.: US 6,891,849 B1
(45) Date of Patent: May 10, 2005

(54) FIELDBUS COMPONENTS, COMMUNICATION SYSTEM AND PROCESS FOR THE TRANSMISSION OF DATA OVER A HIGH SPEED TRANSMISSION MEDIUM

(75) Inventors: Jürgen Jasperneite, Steinheim (DE); Kai Fechner, Barntrup (DE)

(73) Assignee: Phoenix Contact GmbH & Co., Blomberg (DE)

( * ) Notice: Subject to any disclaimer, the term of this patent is extended or adjusted under 35 U.S.C. 154(b) by 0 days.

(21) Appl. No.: 09/330,949

(22) Filed: Jun. 11, 1999

(30) Foreign Application Priority Data

Jun. 12, 1998 (DE) .......................................... 198 26 154
Jun. 12, 1998 (DE) ...................................... 298 10 482 U
Nov. 6, 1998 (DE) .......................................... 198 51 245

(51) Int. Cl.[7] .............................................. H04L 12/66
(52) U.S. Cl. ....................................... 370/463; 370/465
(58) Field of Search ................................. 370/389, 465, 370/469, 463, 462, 464; 700/1

(56) References Cited

U.S. PATENT DOCUMENTS

| 5,754,540 A | * | 5/1998 | Liu et al. ..................... 370/315 |
| 5,809,249 A | * | 9/1998 | Julyan ......................... 709/223 |
| 5,892,926 A | * | 4/1999 | Witkowski et al. .......... 710/100 |
| 5,970,430 A | * | 10/1999 | Burns et al. ................. 702/122 |
| 5,978,578 A | * | 11/1999 | Azarya et al. ............... 717/100 |
| 6,154,464 A | * | 11/2000 | Feuerstraeter et al. ...... 370/463 |
| 6,233,626 B1 | * | 5/2001 | Swales et al. ................ 710/11 |
| 6,370,448 B1 | * | 4/2002 | Eryurek ....................... 700/282 |
| 6,424,872 B1 | * | 7/2002 | Glanzer et al. ............... 700/18 |

OTHER PUBLICATIONS

McCool, J.; 100BASE–T: an overview WESCON/'95. Conference record. 'Microelectronics Communications Technology Producing Quality Products Mobile and Portable Power Emerging Technologies', Nov. 7–9, 1995, Page(s): 342.*

Wood, G.; IEC 61158: The Fieldbus Standard. Its Influence and Present Status, Open Control in the Process and Manufacturing Indusgtries (Digest No. 1998/281), IEE Colloquium on, May 15, 1998 Page(s): 1/1–1/9.*

Demartini, C.; Cena, G.; Real–time communication in the factory automation; 'Power Electronics and Motion Control'., Proceedings of the 1992 International Conference on, Nov. 9–13, 1992; Page(s): 772–777 vol. 2.*

* cited by examiner

Primary Examiner—Chi Pham
Assistant Examiner—Keith M. George

(57) ABSTRACT

The invention realizes high speed data transmission, as known from the Fast Ethernet, with fieldbus systems in the field of industrial automation. A suitable fieldbus component includes a data link layer, which operates with a fieldbus protocol, and a physical layer, which is constituted for high speed data transmission. There are also provided an interface, which connects the data link layer and the physical layer, and a layer for matching the data link layer to the physical layer.

10 Claims, 2 Drawing Sheets

FIELDBUS COMPONENTS, COMMUNICATION SYSTEM AND PROCESS FOR THE TRANSMISSION OF DATA OVER A HIGH SPEED TRANSMISSION MEDIUM

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates to a fieldbus component, a communication system including several fieldbus components, and also a process of the transmission of data over a high speed transmission medium.

2. Discussion of Relevant Art

So-called fieldbus systems are used today in automation technology as a technique for connecting between the equipments taking part in the production process. These fieldbus systems usually work at transmission rates <10 Mbit/s. There is a need for higher bandwidth of the fieldbus systems because of the increasing penetration of the fieldbus systems into all regions of automation technology, on the one hand, and the increasing capacity of the control systems on the other hand.

In the field of information technology, and particular in the local area network region, there already exist networks, known as Ethernet, with a bandwidth of 10 Mbit/s. This network technology is constantly being developed, corresponding to the constantly increasing need for bandwidth. Transmission speeds of 100 Mbit/s at a distance of up to 100 m are made possible by the use of a copper-based transmission medium. This network is also known as Fast Ethernet.

SUMMARY OF THE INVENTION

The present invention has as its object to provide a fieldbus component, a communication system, and a process with which it is possible to use fieldbus components in high speed data transmission.

The invention attains the solution of this problem with a fieldbus component including a data link layer and a physical layer. The physical layer is constituted for a high speed data transmission. An interface connecting the data link layer and the physical layer, and a layer for matching the data link layer, which operates with a fieldbus protocol, to the physical layer, are provided.

According to the invention, the fieldbus component has a data link layer (this corresponds to layer 2 of the OSI reference model) and a physical layer (this corresponds to the first layer of the OSI reference model). In order to make the fieldbus component capable of a high speed data transmission, the physical layer is constituted for high speed data transmission. Furthermore, there are provided an interface which connects the data 20 link layer and the physical layer, and also a layer for matching the data link layer, which operates with a fieldbus protocol, to the physical layer.

The Fast Ethernet offers a suitable transmission technique, with a transmission rate of 100 Mbit/s. In this case, the physical layer is constructed according to the IEEE 802 standard of the Fast Ethernet. An advantage of this is that the already existing, standard physical layer and its acceptance in the field of office communications has given rise to numerous semiconductor implementations. These components which implement the physical layer are already available on the market at a favorable price.

As the interface which connects the physical layer and the data link layer, the likewise standardized Medium Independent Interface (MII) according to the IEEE 802 standard can be used.

For the fieldbus components, there are concerned, for example, components which are suitable for the EN50258 standard, which was developed for the Interbus fieldbus system, with the exception of the layer 1 described there.

In a known manner, the data link layer includes a medium access control layer, a basic connection layer, a peripheral data connection layer, and a network management layer.

According to a further aspect of the invention, a communication system, in particular an automation system, has a high speed data transmission medium to which several fieldbus components can be coupled.

The high speed data transmission medium is constructed for fieldbus systems as a linear structure, from which stub leads can branch. The fieldbus components are actively coupled to the transmission medium.

It should be mentioned at this point that the fieldbus components can all contain partial layers. It is furthermore conceivable to implement the data link layer and if necessary the matching layer in the fieldbus component, and the physical layer together with the interface in a separate module associated with the high speed data transmission medium.

A further aspect of the invention is directed toward a process for the transmission of data over a high speed data transmission medium to which several fieldbus components are connected.

BRIEF DESCRIPTION OF THE DRAWINGS

The invention will be described in more detail hereinbelow in connection with the accompanying drawings, in which.

DETAILED DESCRIPTION OF PREFERRED EMBODIMENTS

Figure 1:
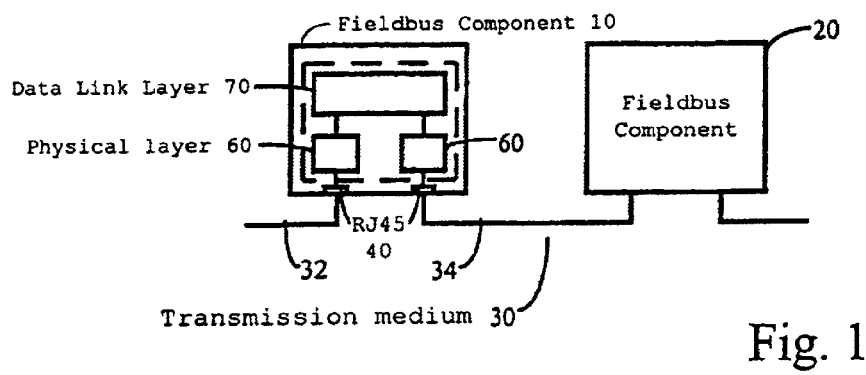
FIG. 1 shows a diagram of a fieldbus system with two fieldbus components connected to a high speed data transmission medium.

FIG. 1 shows two fieldbus components 10 and 20, which are connected in series to a high speed data transmission medium 30 corresponding to the Fast Ethernet network technology. The connection of the fieldbus components 10, 20 to the transmission medium 30 takes place, for example, by means of a RJ-45 plug connector 40. The fieldbus components 10 and 20 have respective separate, identically constructed, channels of a physical layer 60 for an input lead 32 and for an output leas 34 of the transmission medium. 30. It may be pointed out here that the leads 32 and 34 can be made bidirectional.

Figure 2:
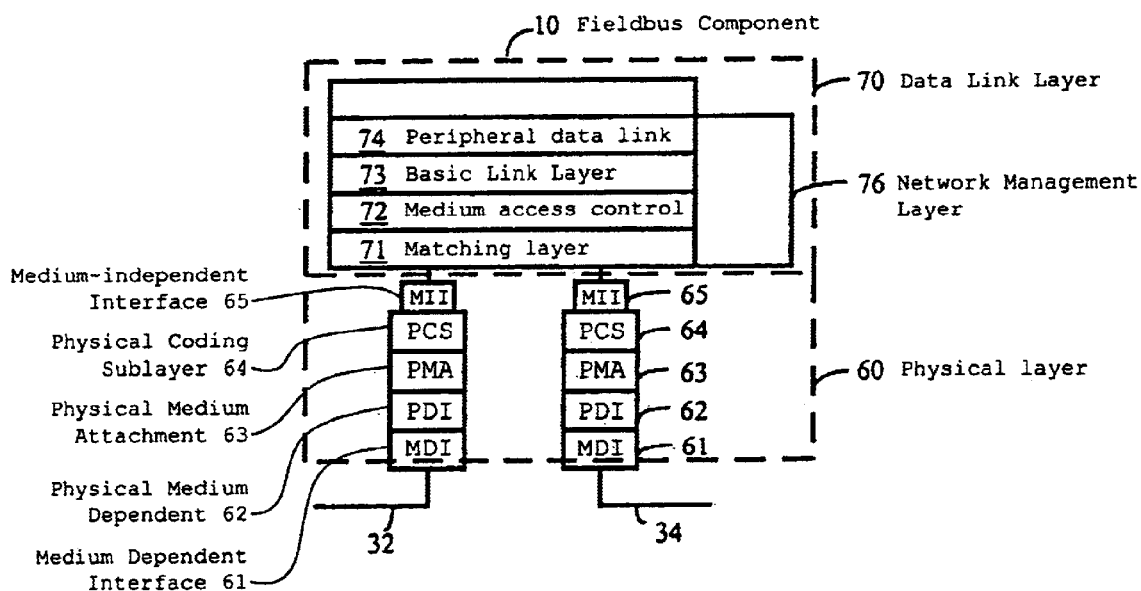
FIG. 2 shows a detailed sketch of a basic circuit of the fieldbus component according to the invention.

The physical layer 60 shown in FIG. 2 is constructed according to the IEEE 802.3u standard, and hence is known. A detailed description of the individual functional units is therefore unnecessary. For completeness, only the important functional units are named here: the medium-dependent interface 61 (Medium Dependent Interface, MDI), which produces the direct connection to the transmission medium 30. Furthermore the physical layer includes a physical, medium-dependent interface (Physical Medium Dependent, PDI) 62, a physical connection layer (PMA, Physical Medium Attachment) 63, and also a physical coding sublayer 64, which is followed by a medium-independent interface MI) (Medium Independent Interface) 65. The medium-independent interface 65 produces the connection to the data link layer 70. The medium-independent interface 65 can alternatively be constituted as a Reduced Medium Independent Interface, R-MII) or as the symbol interface.

Figure 3:
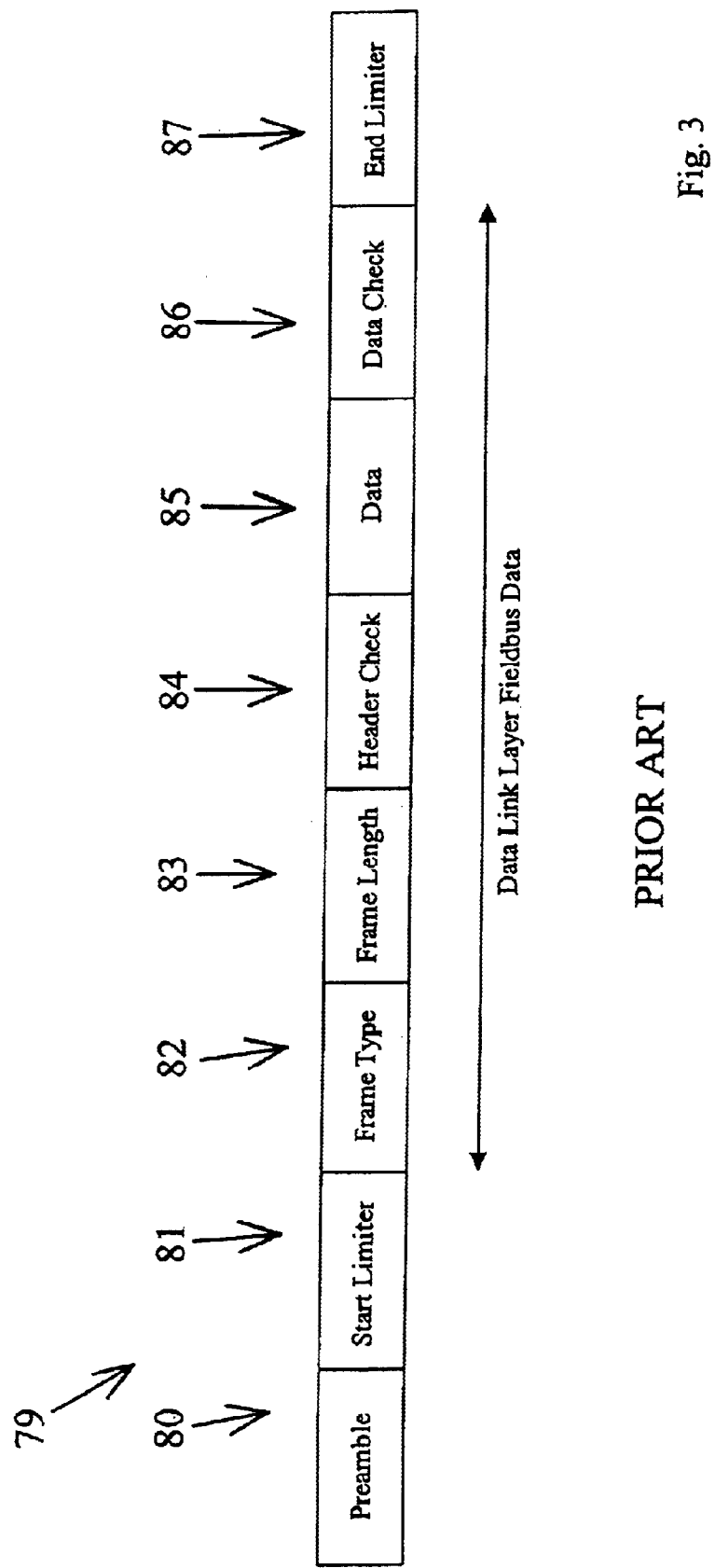
FIG. 3 shows a frame to be transmitted.

The data coming from the user of the data link layer 70 are combined into a frame 79 to be transmitted (FIG. 3), which typically consists of a preamble 80, a start limiter field 81, a frame type field 82, a frame length field 83, a header check field 84, the data field 85 proper, a data check field 86, and an end limiter field 87. Since however, as regards the fieldbus components 10 and 20, no Fast Ethernet compatible assembly is concerned, a matching layer 71 is required which matches the data frame prepared by the data link layer 70 of the fieldbus components 10, 20 to the physical layer 60 of the Fast Ethernet These field data are furthermore passed on to the medium-independent interface 65 and the underlying physical layers 64–61, and are transmitted by means of the transmission medium 30 of the subsequent fieldbus.

We claim:

1. A fieldbus component comprising:
   a data link layer, which operates with a fieldbus protocol,
   a physical layer constituted for high speed data transmission,
   a standardized medium-independent interface connecting said data link layer and said physical layer, and
   a layer for matching said data link layer to said physical layer constituted for high speed data transmission by embedding the data coming from said fieldbus protocol based data link layer into a fame to be transmitted, the frame being accepted by said physical layer and comprising a preamble, a start limiter field, a data field and an end limiter field.

2. The fieldbus component according to claim 1, in which said data link layer comprises a medium access control layer, a basic connection layer, a peripheral data connection layer and a network management layer.

3. A communication system, comprising at least one fieldbus component according to claim 2 and a high speed data transmission medium, to which said at least one fieldbus component is connected.

4. The fieldbus component according to claim 1, in which said physical layer constituted for high speed data transmission is constituted according to the IEEE 802.3u standard of the Fast Ethernet.

5. A communication system, comprising at least one fieldbus component according to claim 4 and a high speed data transmission medium, to which said at least one fieldbus component is connected.

6. A communication system, comprising at least one fieldbus component according to claim 1 and a high speed data transmission medium, to which said at least one fieldbus component is connected.

7. The communication system according to claim 6, in which said high speed data transmission medium has a linear structure and said fieldbus component is actively coupled to said high speed data transmission medium.

8. The communication system according to claim 6, in which said high speed data transmission medium has at least one branch.

9. A process for transmission of data over a high speed data transmission medium to which several fieldbus components are coupled, comprising the following process steps:
   (a) receiving data coming from the data link layer of a fieldbus component, which uses a fieldbus protocol, at a matching layer of said fieldbus component connecting said data link layer of said fieldbus component and a standardized medium-independent interface of said fieldbus component,
   (b) matching said data link layer to a physical layer of said fieldbus component constituted for high speed data transmission by embedding said data into a transmission frame, said frame being accepted by said physical layer of said fieldbus component and comprising a preamble, a start limiter field, a data field and an end limiter field, and
   (c) passing on said transmission frame to the physical layer of said fieldbus component, said physical layer of said fieldbus component being constituted for high speed data transmission, and
   (d) feeding said data to be transmitted to said high speed data transmission medium via said physical layer of said fieldbus component.

10. A process for transmission according to claim 9, wherein the physical layer is constituted according to IEEE 802.3u.

* * * * *